Nov. 15, 1966  J. F. SEBALD ET AL  3,284,993
FOAM COLLECTION AND DISPOSAL SYSTEM
Filed June 28, 1963  4 Sheets-Sheet 1

JOSEPH F. SEBALD
IGOR J. KARASSIK
HUNT DAVIS
ARTHUR E. CARTER
INVENTORS

BY Daniel H. Bobis
Atty.

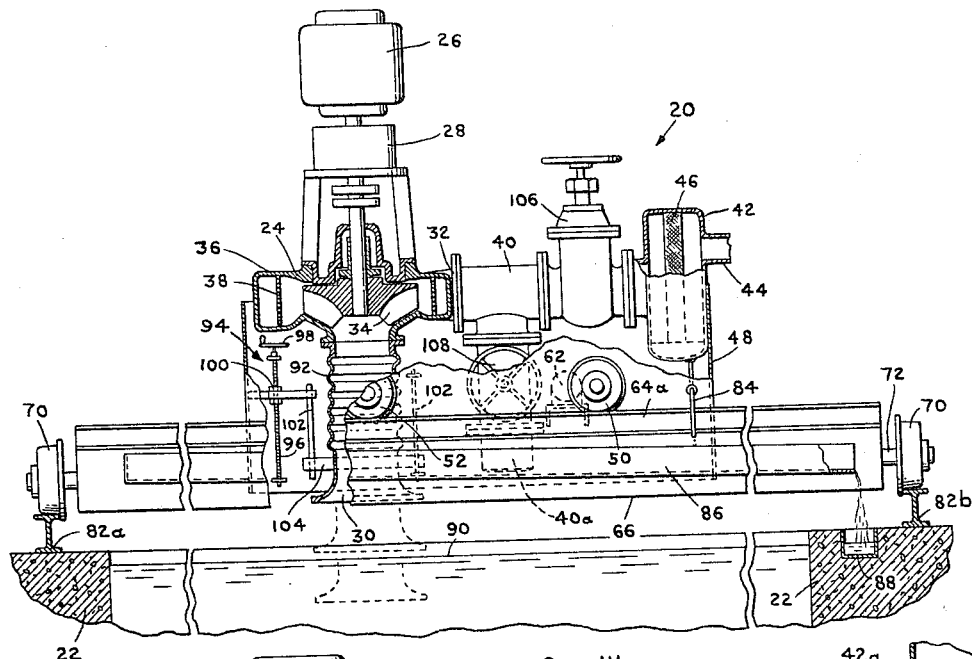
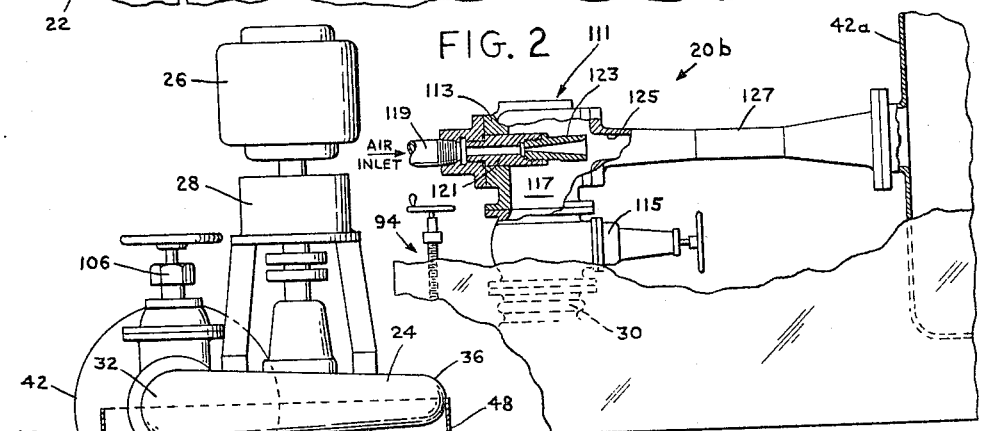
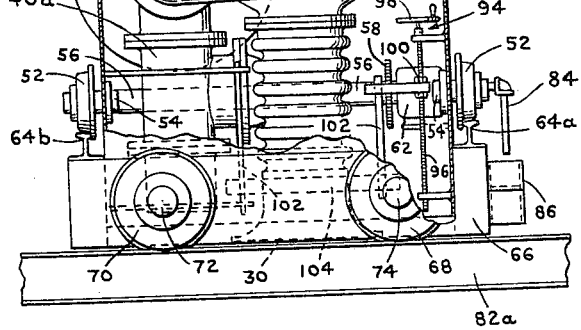

JOSEPH F. SEBALD
IGOR J. KARASSIK
HUNT DAVIS
ARTHUR E. CARTER
INVENTORS

BY Daniel H. Bobis
Atty

Nov. 15, 1966 J. F. SEBALD ET AL 3,284,993
FOAM COLLECTION AND DISPOSAL SYSTEM
Filed June 28, 1963 4 Sheets-Sheet 4

JOSEPH F. SEBALD
IGOR J. KARASSIK
HUNT DAVIS
ARTHUR E. CARTER
INVENTORS

United States Patent Office 3,284,993
Patented Nov. 15, 1966

3,284,993
FOAM COLLECTION AND DISPOSAL SYSTEM
Joseph F. Sebald, Bloomfield, Igor J. Karassik and Hunt Davis, Maplewood, and Arthur E. Carter, Summit, N.J., assignors to Worthington Corporation, Harrison, N.J., a corporation of Delaware
Filed June 28, 1963, Ser. No. 291,556
16 Claims. (Cl. 55—178)

This invention relates generally to a foam collection and disposal system. More particularly the invention relates to the collection and removal of foam caused by synthetic surfactants, detergents, pesticides and various petrochemical contaminants of the foaming type.

In the prior art much difficulty has been encountered in the collection and disposal of foam caused by the above agents, as these contaminants remain in the effluent from sewage and waste water treatment plants. Since they are not readily destroyed by natural stream purification processes they may persist almost indefinitely in the streams which receive treated sewage or waste water effluent.

A typical example of the foaming problem can be found in the activated sludge treatment of sewage.

The activated sluduge treatment of sewage refers to a treatment process which assists the oxidation of dissolved organic compounds contained in raw sewage by mixing this raw sewage with a recirculated sludge or cultured bacterial mass. Oxidation is further assisted by the aeration of the sewage. The aeration mixes the effluent from primary treatment with the returned activated sludge, keeps the sludge in suspension and supplies the oxygen required in the biochemical oxidation and chemical oxidation processes. Aeration is accomplished either by diffusing compressed air into the sewage or by mixing and agitating the sewage by mechanical means.

This aeration process is generally accompanied by frothing or foaming, wherein the surface of activated sludge tanks becomes covered with an appreciable layer of foam. This foam is a nuisance and also presents other problems. Beyond the fact that it is unsightly and kills plants and grass when blown on them by wind, the foam has a high bacteria count which may constitute a health hazard.

Several methods are in use presently to control or diminish foam formation. Defoaming agents may be added to the activated sludge tanks. A higher suspended solids content may be maintained in the tanks. Finally, water sprays may be directed at the surface of the tanks to collapse the foam.

All of these means combat the symptoms but do not cure the problem. Nor do they take advantage of the opportunity of getting rid of a large portion of the contaminants which are attracted to and make up part of the foam bubbles.

It should be noted that these problems are not restricted to sewage treatment but also are equally applicable in the collection and disposal of foams in the glue and paper industries, in the processing of foodstuff, or in any other process where foam may be generated and its presence is undesirable.

An object of this invention is to overcome the prior art difficulties by providing an improved system for the collection and disposal of foam; which is efficient and effective; which can be used with existing plants; which uses air to facilitate the collection and disposal of the foam; which may be movably mounted to enable total foam; which may be collected and disposed of; which can surface foam to be collected and disposed of; which can induce foaming at a desired location and thereafter collect and dispose of the foam; which can be cleaned by backwashing means or by drawing in fluid instead of foam.

Other objects and advantages will be apparent from the following description of several embodiments of the invention and the novel features will be particularly pointed out hereinafter in the claims.

In the drawings:

FIGURE 2 is a side elevation, partly in section, showing the novel system of FIGURE 1.

FIGURE 3 is a front elevation, partly in section, showing the novel system of FIGURE 1.

FIGURE 4a is a front elevation, partly in section, showing still another form of the system of FIGURE 1.

Figure 1:
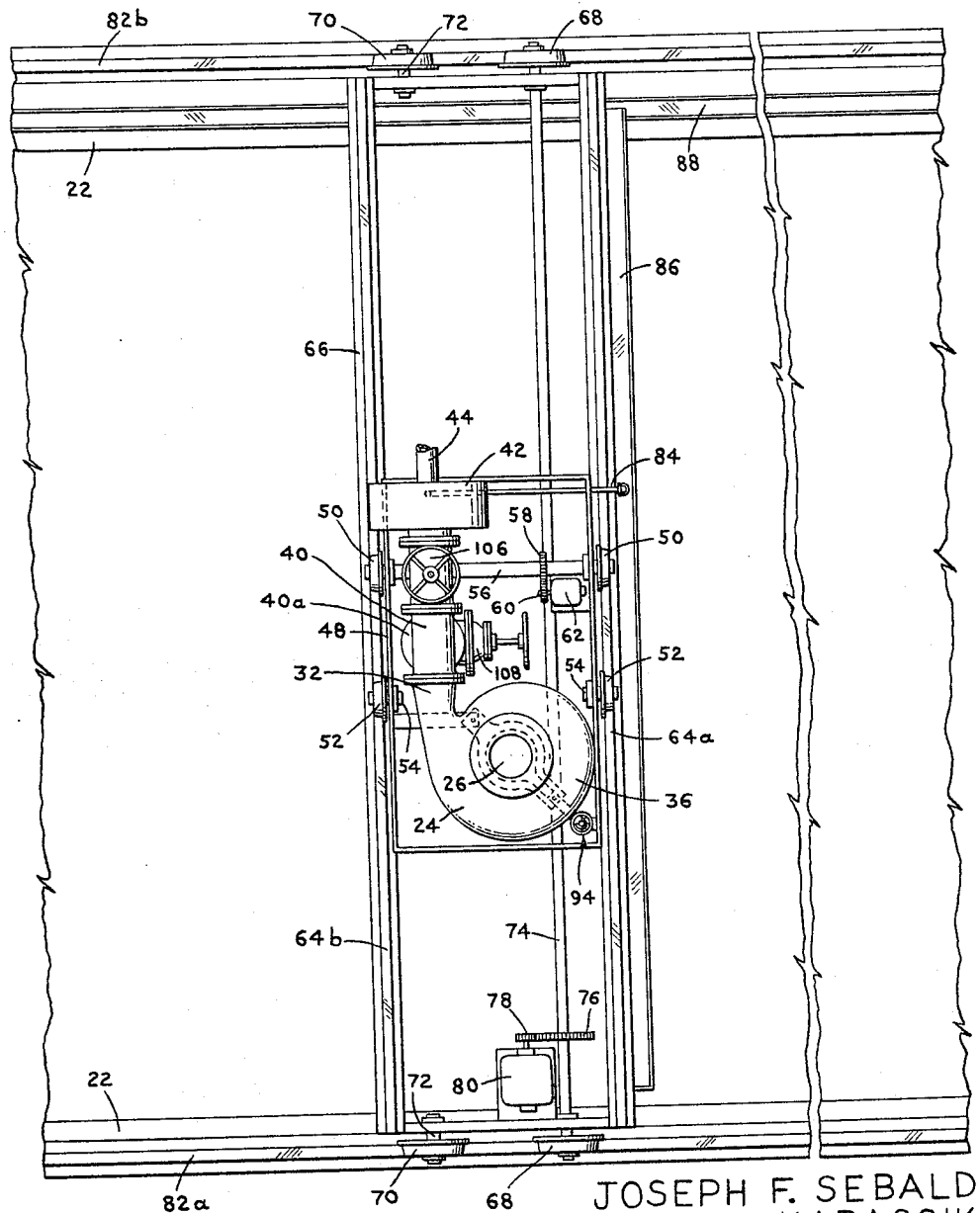
FIGURE 1 is a plan view of the novel system for the collection and disposal of foam including means for moving such device over the entire surface of the associated tank.

In the embodiment of the invention illustrated in FIGURES 1 to 3 the novel foam collection and disposal system 20 is shown in association with a treatment tank 22. The novel system 20 includes a suitable evacuating means such as a centrifugal blower 24 powered by a suitable source of rotatable energy such as motor 26. The rotatable energy from motor 26 may be suplied through speed changer 28.

Centrifugal blower 24 has an adjustable suction inlet 30 and an outlet 32. On motor 26 being activated impeller 34 will draw in foam and air through suction inlet 30 and will induce centrifugal separation of the liquid in the foam to cause collapse of the foam to be discharged from volute 36 to outlet 32. To assist in this operation a centrifuging screen 38 may be used so that the liquid from the collapsed foam is separated from the air stream. The amount of air induced into the suction inlet will be sufficient to provide a vehicle for transporting the foam and causing the foam to collapse by air turbulence and dilution in addition to the centrifuging action, and to carry away foam in liquefied droplet form out of the outlet 32 into the discharge line 40 from which it passes to the separating tank 42. As the air in separating tank 42 may contain small quantities of entrained moisture and mist before passing to the atmosphere through air discharge 44 it will flow through mist separator 46 for final "drying."

Novel system 20 is suitably mounted in equipment car 48 which has pairs of wheels 50 and 52. Wheels 52 have independent axles 54 suitably mounted to equipment car 48. Wheels 50 are joined by a single axle 56 which has mounted thereon gear 58 and it is wheels 50 which provide the motive power for equipment car 48. Gear 58 is engaged and rotated by gear 60 which in turn is driven by the car drive motor 62. Wheels 50 and 52 are mounted on tracks 64a and 64b of bridge means 66 so that equipment car 48 is free to travel the length of bridge means 66 in either direction.

Bridge means 66 has pairs of wheels 68 and 70 mounted thereon in similar fashion to the wheel mountings of equipment car 48. Wheels 70 have independent axles 72 and wheels 68 are operatively connected by axle 74 to suitably drive bridge means 66. A gear 76 is mounted on one side of axle 74 and will be driven by gear 78 of bridge motor 80. Wheels 68 and 70 are mounted on and move along tracks 82a and 82b which are disposed on either side of the treatment tank 22. Thus bridge means 66 move along the length of treatment tank 22 while the equipment car 48 may move at right angles thereto. In this manner the surface of the treatment tank may be systematically traversed so that the suction inlet 30 of centrifugal blower 24 may traverse the entire surface of the treatment tank 22. One way of accomplishing this is to have the bridge means 66 move in increments along the treatment tank 22 with the equipment car 48 traveling the length of bridge means 66 on each incremental movement thereof as more fully described hereinafter.

The liquefied foam in the separating tank 42 may be stored in an auxiliary tank (not shown) or disposed of in any suitable manner such as by gravity flow out of liquefied foam drain 84 for delivery to trough 86 of bridge means 66. Trough 86 extends the length of bridge means 66 and is mounted at a suitable angle so that the liquefied foam will flow by gravity to the lower end thereof and be discharged into trough 88 disposed along the length of treatment tank 22. Since troughs 86 and 88 run the length of the bridge means 66 and treatment tank 22 they will be able to transport the liquid foam regardless of the respective position of equipment car 48 or bridge means 66.

The suction inlet 30 may have an opening thereof of suitable size, shape and area, which opening may also be arranged and constructed so as to be selectively adjustable. In this way the amount of air can be regulated as desired.

Since the liquid level 90 in treatment tank 22 may vary in height suction inlet 30 may be provided with an adjustable member 92, the position of which may be regulated by adjustment means 94 so that it can be positioned as desired. Adjustment means 94 has a threaded rod 96 with a turnable handle 98 at the upper end thereof. The rod 96 has a member 100 engaged therewith and on turning of handle 98 member 100 will move, but not turn, up or down the rod 96. Linkage means 102 is connected to member 100 so that on movement of member 100 the linkage means will transmit this movement to collar member 104 which is connected to the lower end of suction inlet 30. In this way by appropriately turning handle 98 the suction inlet 30 may be raised or lowered as desired.

In addition to adjusting the position of suction inlet 30 corresponding to the level of liquid level 90 it may be desirable to submerge the suction inlet 30 below the liquid level 90 so that liquid may be drawn into centrifugal blower 24 much in the same way as if it were a pump so that centrifugal blower 24 may be cleaned out and have any solid particles entrapped therein discharged therefrom. For the cleaning operation the speed of impeller 34 should be substantially lower than when it is used as a blower means. To accomplish this the speed changer 28 will reduce the speed accordingly. Further, since no good purpose would be served by having the liquid enter separating tank 42 a valve 106 which is normally open is placed adjacent the entrance of the separating tank 42 and an alternate discharge line 40a is connected to discharge line 40 between the outlet 32 and valve 106. Discharge line 40a has a valve 108 therein which during normal operation of centrifugal blower 24 will be closed. However, during the cleaning operation valve 108 is opened and valve 106 is closed so that the liquid will be discharged out of discharge line 40a.

Figure 4:
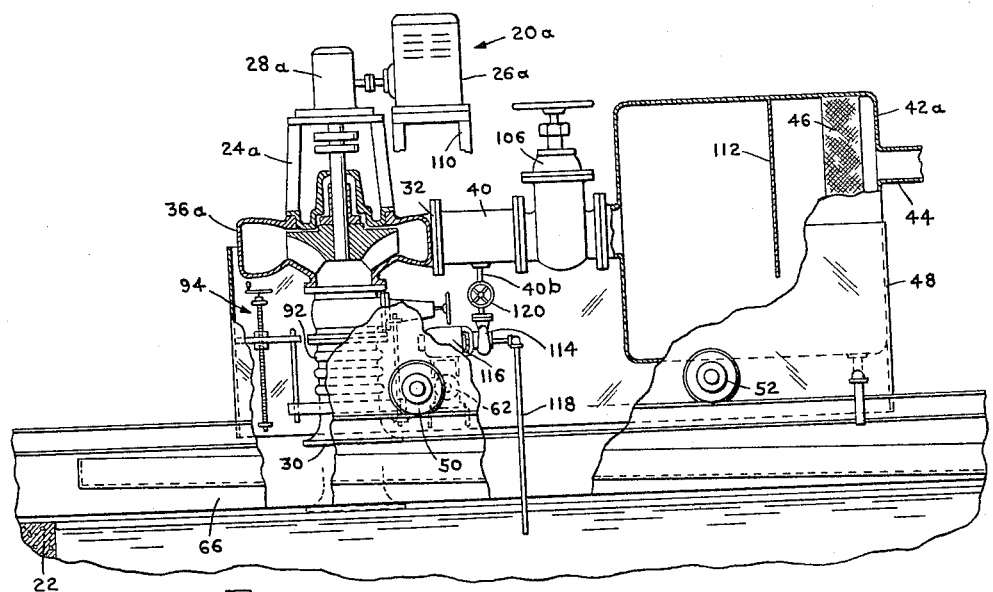
FIGURE 4 is a front elevation, partly in section, showing another form of the system of FIGURE 1.

In the embodiment of the invention illustrated in FIGURE 4, a novel foam collection and disposal system 20a is shown in association with a treatment tank 22. System 20a is substantially the same as system 20 except that certain components have been modified or changed. Where no change has taken place the components will be numbered in the same manner as they were for system 20. Since the operation of system 20a is substantially the same as system 20 it will not be repeated unless it deals with the modification.

Further, system 20a is mounted in equipment car 48 and will move therewith as did system 20 with the one exception that the position of wheels 50 and 52 has been substantially reversed so that car drive motor 62 is adjacent inlet 30 instead of remote therefrom, but the operation is the same. Centrifugal blower 24a will be powered by internal combustion engine 26a suitably mounted to the equipment car 48 as by beams 110. The engine 26a may deliver its power through gearing 28a to operate centrifugal blower 24a. Centrifugal blower 24a has a volute 36a therein and the centrifuging screen 38 is not used. The mixture of air and liquefied foam will be discharged from centrifugal blower 24a through outlet 32 and discharge line 40 into separating tank 42a. Separating tank 42a has a baffle 112 disposed therein intermediate the connection with line 40 and mist separator 46. Baffle 112 will serve to separate the air and liquefied foam by forcing the air to flow thereabout before passing through the mist separator 46 and being discharged out of the air discharge 44.

Centrifugal blower 24a will be cleaned by a backflow operation. For this purpose line 40 has a normally open valve 106 which will be closed during the cleaning operation. In addition an auxiliary pump assembly 114 having a source of motive power 116 operatively connected thereto is mounted in car 48. Pump 114 has an inlet line 118 which is disposed below the liquid level in tank 22. Discharge line 40b is connected between discharge 40 and pump 114 and has a valve 120 therein which is normally in the closed position but during backwash operation will be opened to allow liquid to pass through discharge line 40b into line 40 and through outlet 32 to volute 36a and thereafter through suction inlet 30. Thus any entrained solids may be removed from centrifugal blower 24a.

In the embodiment of the invention illustrated in FIGURE 4a, a novel foam collection and disposal system 20b is adapted to be associated with a treatment tank (not shown) in an analogous manner as were systems 20 and 20a and it may be suitably mounted for traversing the surface of said tank. System 20b is substantially the same as systems 20 and 20a except that the type evacuating means used is an ejector means of any conventional design such as air ejector 111. Further, like characters are used to depict similar components described hereinbefore.

Ejector 111 has a housing 113 the lower end of which connects to suction inlet 30 and a valve 115. Housing 113 has a chamber means 117 formed therein. An air inlet line 119 is connected to a suitable source of motive air (not shown) and to housing 113 to deliver the motive air through member 121 and nozzle 123 into chamber 117 and to be discharged therefrom into the diffuser entrance 125 of the diffuser 127 which suitably connects into separating tank 42a. Sufficient motive air will be delivered from line 119 into chamber 117 to induce the foam and transporting air through inlet 30 into chamber 117 wherein the combination of foam and transporting air is mixed with the motive air in the diffuser entrance 125 where the velocity energy breaks down the foam to liquid and the large amount of excess air present in the mixture prevents its reconstitution but rather serves to transport the liquefied foam to the separating tank 42a wherein it will be separated from the air and discharged in the manner described hereinbefore.

Ejector 111 may be cleaned in the same manner as described for the centrifugal blower, i.e., by adjusting the inlet 30 below the liquid surface and drawing liquid through ejector 111 to thereby remove any entrained solids therein.

Figure 5:
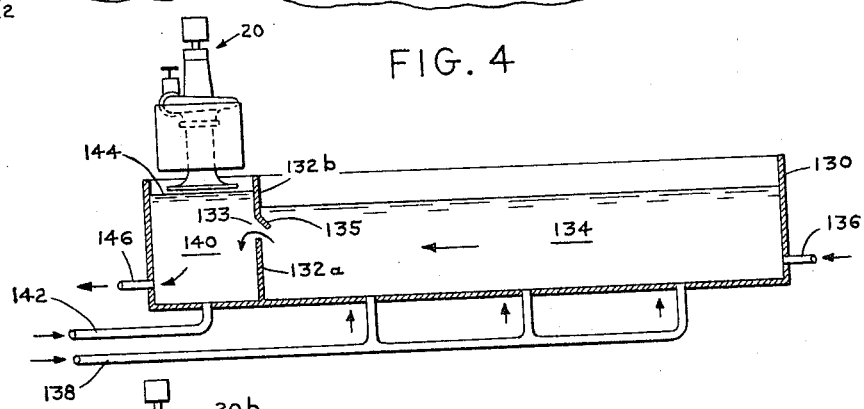
FIGURE 5 is a diagrammatic sketch of the novel system shown in operative association with a sewage treatment process.

One application of the novel foam collection and disposal system is shown in FIGURE 5 wherein system 20 is shown in association with the activated sludge treatment of sewage.

The retention time in the activated sludge aeration tanks is from four to six hours for domestic sewage and from ten to twelve hours for strong industrial wastes. This is considerably longer than the time required to separate detergents from the sewage by aeration and foaming which would normally take from three to ten minutes. At the same time the amount of air required per square foot of exposed area to promote foaming is considerably in excess of the air required and normally supplied for activated sludge treatment. It would be uneconomical therefor to supply air to the activated sludge tanks at the increased rate required for removing detergents during the entire retention period required for Biochemical Oxygen Demand and Chemical Oxygen Demand reduction.

Therefore aeration tank 130 is divided into two sections by baffles 132a and 132b which have an opening 133 therebetween. Louver 135 is disposed on the lower end of baffle 132b and permits the liquid to flow through opening 133 as indicated by the arrow but prevents the bubbling air from line 142 from leaving section 140. The first and larger section 134 has the effluent introduced thereto from line 135 and an air supply delivered thereto from a suitable source of air through line 138 to promote Biochemical Oxygen Demand and Chemical Oxygen Demand reduction in the usual manner. Thereafter the treated effluent will flow through opening 133 into the second section 140 which has a separate supply of air delivered thereto through line 142. An over abundance of air is supplied through line 142 and will be diffused through section 140 to promote rapid foaming above the surface 144 thereof. The effluent from section 140 will be discharged through line 146. Since the air from line 142 is diffused through section 140 a very great number of small air bubbles are formed and rise through the treated effluent. The formation of these air bubbles near the bottom of section 140 provides new air-water interface at which the detergents or surfactants concentrate because such substances are "surface active." As the bubbles rise they break thus causing the concentration of detergents or surfactants to increase near the top surface 144. Since this concentration is greater than the minimum required for frothing or foaming, foam builds up on the surface of the liquid.

The foam is readily collected and disposed of by either of the novel systems 20, 20a or 20b, with system 20 being shown, and in which the centrifugal blower 24 will induce the foam and sufficient air, as required, to sustain the entrainment velocity to the blower suction and sufficient impeller 34 peripheral speed to induce centrifugal separation of liquid from the foam film to droplet form. Thereafter the liquefied foam will be disposed of in any suitable manner as, for example, as was described hereinbefore.

Figure 6:
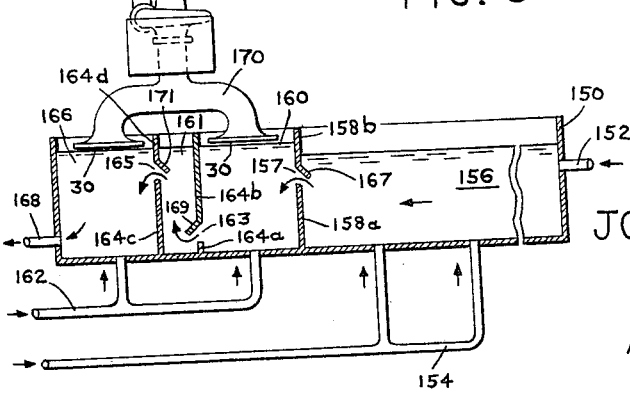
FIGURE 6 is a diagrammatic sketch of the novel system shown in operative association with another form of treatment process.

Depending upon the type and character of the treatment process which requires the removal of foam it may be desirable to utilize a plurality of defoaming or fractionation sections. As shown in FIGURE 6 aeration tank 150 has effluent delivered thereto by line 152 and air supplied through line 154. Effluent from line 152 is introduced into the first section 156 wherein normal Biochemical Oxygen Demand and Chemical Oxygen Demand reduction takes place. Thereafter it will flow through opening 157 in baffles 158a and 158b into the first fractionation section 160. In section 160 the treated effluent will be exposed to the diffused air from line 162 and thereafter the effluent will flow through opening 163 in baffles 164a and 164b into flow section 161 and through opening 165 in baffles 164c and 164d into the second fractionation section 166 where it will be again exposed to diffused air from line 162 and thereafter be discharged through line 168.

Louvers 167, 169 and 171 respectively prevent escape of bubbling air from line 162 as was described hereinbefore. The air will be diffused in fractionation sections 160 and 166 in the same manner as was described under FIGURE 5, thus causing foaming above the liquid surface thereof. Instead of providing separate foam collection and disposal systems a system 20b may be used which has a suction manifold 170 connected to suction inlet 30 so that foam may be simultaneously collected from sections 160 and 166 in the same manner as described hereinbefore.

Figure 7:
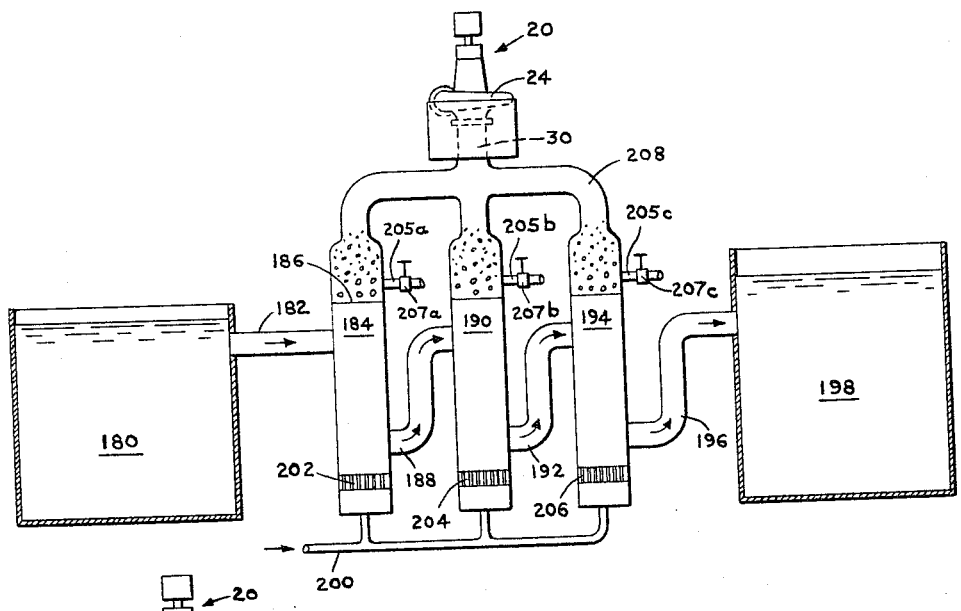
FIGURE 7 is a diagrammatic sketch of the novel system including fractionation columns in operative association with a treatment process.

Instead of having the fractionation taking place in a unitary tank separated by a plurality of baffles for certain treatment processes it may be desirable to use a plurality of fractionation columns as illustrated in FIGURE 7. Thus on the effluent leaving the aeration tank 180 through line 182 it would enter fractionating column 184 adjacent to but below the expected liquid level 186 therein. The effluent will flow in a downward direction to the discharge line 188 which serves as the inlet line for the next fractionating column 190 wherein the same flow pattern is followed and the effluent will be discharged from line 192 into fractionating column 194 and thereafter discharged through line 196 into a final settling tank 198 from which it may be suitably transported or discharged into a natural source such as a river or lake. In each of the fractionating columns 184, 190 and 194 there is connection at the bottoms thereof with an air supply line 200 which is connected to a suitable source of air. Near the bottom but spaced above the connection to air line 200 each fractionating columns 184, 190 and 194 there are diffusion plates 202, 204 and 206 respectively tranversely disposed therein. The air will enter the fractionating column and pass through the diffusion plate which will induce a great number of very small air bubbles. These bubbles will rise in the columns and attract and collect the surface active contaminants of the effluent. The air supply will be sufficient to cause foaming in each column above the liquid line. The upper end of each of the fractionating columns 184, 190 and 194 is connected to a suction manifold 208 which connects into suction inlet 30 of centrifugal blower 24.

Disposed intermediate the manifold 208 and the liquid level of the columns 184, 190 and 194 is a suitable air bleed 205a, 205b and 205c connected to the respective columns. In order to control the quantity of air induced into the columns 184, 190 and 194 each air bleed has a valve 207a, 207b and 207c disposed therein. In this way a controlled amount of air will be drawn into the suction inlet along with the foam. The air will serve to transport the foam as described hereinbefore. On operation of centrifugal blower 24 of the foam collection and disposal system 20 the foam and the controlled amount of air in fractionating columns 184, 190 and 194 will be drawn into the manifold 208 and suction inlet 30 from which it will be disposed of in a manner described hereinbefore.

Figure 8:
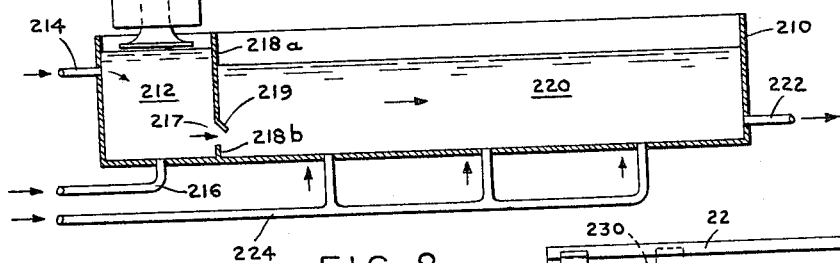
FIGURE 8 is a diagrammatic sketch of the novel system shown in operative association with still another form of treatment process.

It may be desirable to remove the surface active contaminants such as surfactants and detergents before passing the effluent through the aeration tanks of the treatment process. Thus as shown in FIGURE 8 aeration tank 210 has a baffled section 212 formed therein into which effluent is delivered through line 214. Air is supplied to section 212 through line 216 and will be diffused through section 212. The effluent after having the air diffused therethrough will flow through opening 217 of baffles 218a and 218b, which opening is protected by louver 219, as described hereinbefore, into the retention section of the larger section 220 wherein Biochemical Oxygen Demand and Chemical Oxygen Demand reduction takes place. The effluent will be discharged through discharge line 222. The usual amount of air is supplied to section 220 through line 224. A sufficient amount of diffused air is supplied by line 216 in section 212 to cause foaming therein above the liquid level thereof. This foam will be removed by a suitable foam collection and disposal system such as system 20 described hereinbefore.

Figure 9:
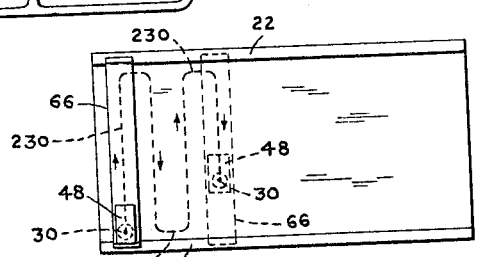
FIGURE 9 is a diagrammatic sketch of the path surface travel of the novel system of FIGURE 1 over the associated tank.
Figure 10:
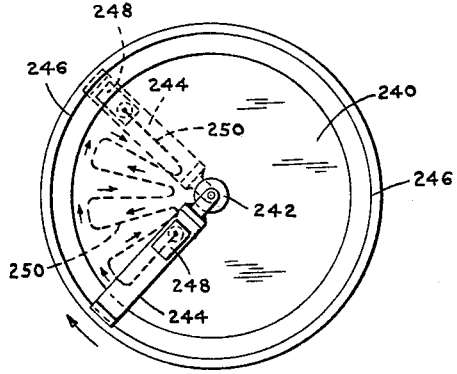
FIGURE 10 is a diagrammatic sketch of the path of surface travel of the novel system of this invention over another form of associated tank.

One form of apparatus for systematically passing the foam collection and disposal system 20 over the entire surface of a treatment tank 22 was shown in FIGURES 1 through 3. By utilizing proper control means (not shown) which means may be either manual or automatic the entire surface area of treatment tank 22 may be traversed as shown in the diagrammatic sketch of FIGURE 9 by following the indicated path 230. In order to approximate this path 230 the movements of the bridge means will be incremental. The length of the increment will be determined by the suction force of centrifugal blower 24. After each incremental movement the bridge means 66 will remain stationary for a sufficient period of time to allow the car means 48 to travel across its complete length so that on reaching one end of the bridge means 66 the bridge means 66 will take another incremental step and once again remain stationary while the car means 48 travels to the other end of the bridge means 66. Thus the process will continually repeat itself until the bridge means 66 reaches one end of the treatment tank 22. Thereafter the bridge means 66 will reverse its incremental steps and travel towards the other end of the treatment tank 22 in like fashion. Thus the car means 48 will move at right angles to the movement of the bridge means and the entire surface area of the treatment tank 22 will be repeatedly systematically traversed.

In certain applications the treatment process may take place in circular tanks in which once again the entire surface thereof is desired to be traversed so that all the foam produced in the circular tank 240 is collected and disposed of. The circular tank will have center post 242 upon which bridge means 244 will pivot about. The other end of bridge means 244 will travel about an endless track 246. Suitable car means 248 are mounted for movement along the length of bridge means 244 in either direction thereof. The bridge means 244 will move in incremental steps measured by a predetermined amount of angular movement along endless track 246 and set off from post 242, which angular movement may be in either direction, but for convenience is assumed to be in the direction shown. During each incremental step the car means 248 will travel the length of the bridge means 244 starting at one end and ending at the other end. On reaching the other end of bridge means 244 the bridge means 244 will advance through the next incremental movement and the car means 248 will travel back to the first mentioned end of bridge means 244. Thus by combining the angular movement of bridge means 244 along endless track 246 and the radial movement of car means 248 first in the direction of track 246 and after the next incremental movement of bridge means 244 in the direction of post means 242 the entire surface of the tank 240 will be systematically traversed. The path that the foam collection and disposal system will take is indicated generally by the dotted line 250.

It will be understood that various changes in the details, materials and arrangements of parts which have been herein described and illustrated in order to explain the nature of the invention may be made by those skilled in the art within the principles and scope of the invention as expressed in the claims.

What is claimed is:

1. A system for the collection and disposal of foam from the surface of a liquid comprising:
 (a) a foam evacuating means having a suction inlet and an outlet;
 (b) the suction inlet so constructed and arranged that the position thereof is adjustable with relationship to the surface of the liquid to draw foam and air into the foam evacuating means, wherein the foam will be collapsed and discharged from the outlet thereof;
 (c) a separating tank connected to the outlet and having separate discharge outlets for air and liquid to separate the air and collapsed foam before discharge therefrom; and
 (d) control means operatively associated with the suction inlet to selectively adjust and position the suction inlet with relationship to the surface of the liquid.

2. The combination claimed in claim 1 wherein a mist separator is disposed in the separating tank intermediate the outlet of the foam evacuating means and the air discharge outlet.

3. In a system for the collection and disposal of foam from the surface of a liquid, the combination comprising:
 (a) a foam evacuating means having a suction inlet and an outlet;
 (b) the suction inlet so constructed and arranged that it is adjustable and adapted to be selectively positioned both above and below the surface of the liquid;
 (c) control means operatively connected to the suction inlet to selectively control the position of the suction inlet with relation to the surface of the liquid so that foam and air will be drawn into the foam evacuating means and collapsed therein when the suction inlet is positioned above the surface of the liquid and liquid will be drawn into the foam evacuating means when the suction inlet is positioned below the surface of the liquid;
 (d) a separating tank having an inlet and separate outlets for air and liquid, the tank so constructed and arranged that collapsed foam and air entering the tank will be separated before discharge therefrom;
 (e) connecting means to connect the outlet of the foam evacuating means to the inlet of the separating tank;
 (f) a line means connected to the connecting means;
 (g) a valve disposed in the line means; and
 (h) a valve disposed in the connecting means intermediate the line means connection and the separating tank, coacting with the valve in the line means so that upon proper setting of the valve in the connecting means and the valve in the line means, the discharge from the foam evacuating means can be selectively apportioned between the line means and the separating tank.

4. The combination claimed in claim 3 including means to backwash the foam evacuating means comprising:
 (a) a pump having an inlet and an outlet;
 (b) the pump outlet connected to the end of the line means remote from the end thereof connected to the connecting means; and
 (c) the pump inlet disposed in a fluid source and coacting with the operation of the pump and proper positioning of the valve in the line means and the valve in the outlet of the foam evacuating means to pump fluid backwards through the foam evacuating means to remove any solids therein.

5. The combination claimed in claim 4 wherein the foam evacuating means includes an ejector means.

6. The combination claimed in claim 4 wherein the foam evacuating means includes a centrifugal blower connected to a means of motive power.

7. The combination claimed in claim 6 wherein:
 (a) the centrifugal blower has a volute therein; and
 (b) a centrifuging screen is disposed in the volute whereby the foam is broken down into liquidfied droplets and the air can pass through the centrifuging screen.

8. The combination claimed in claim 4 including speed control means operatively associated with the foam evacuating means, so constructed and arranged as to vary the speed of the centrifugal blower to have the blower operate at a faster speed when the suction inlet is above the surface of the liquid and drawing in foam and air than when the suction inlet is below the surface of the liquid and drawing in liquid.

9. A foaming agent collection and disposal system for use with a treatment facility having a plurality of tanks, comprising:
 (a) a foam evacuating means having a suction inlet and an outlet, operatively associated with at least one of the treatment tanks;

(b) air supply means connected to at least one of the treatment tanks to supply air to be bubbled through the tanks to induce foaming therein;

(c) the suction inlet so constructed and arranged that the position thereof is adjustable with relationship to the surface of the liquid to draw foam and air into the foam evacuating means wherein the foam will be collapsed and discharged from the outlet;

(d) a separating tank connected to the outlet of the foam evacuating means having separate outlets for air and liquid to separate the air and collapsed foam before discharge therefrom; and (e) control means operatively connected to the suction inlet to selectively adjust the position of the suction inlet in relationship to the surface of the liquid.

10. The combination claimed in claim 9 wherein:

(a) a bridge means movably extends over the top of one of the treatment tanks;

(b) the foam evacuating means is movably mounted on the bridge means; and (c) control means are operatively associated with the foam evacuating means and the bridge means to pass the suction inlet of the foam evacuating means over the entire surface of the treatment tank to collect the foam therefrom.

11. The combination clamied in claim 9 wherein:

(a) a plurality of tanks are formed from a single tank;

(b) baffle means separate the single tank into a plurality of portions thereof; and (c) louver means are disposed in the baffle means and are so constructed and arranged as to direct the effluent into the next portion of the tank and prevent any of the foam formed from leaving that portion of the tank in which it was formed.

12. A foaming agent collection and disposal system for use with a treatment facility having a plurality of tanks comprising:

(a) air supply means connected to at least one of the treatment tanks to supply air to be bubbled through the tanks to induce foaming therein;

(b) a foam evacuating means having a suction inlet and an outlet;

(c) the suction inlet so constructed and arranged that it is adjustable and adapted to be selectively positioned both above and below the surface of the liquid;

(d) control means operatively connected to the suction inlet to selectively control the position of the suction inlet with relation to the surface of the liquid whereby foam and air will be drawn into the foam evacuating means and collapsed therein when the suction inlet is positioned above the surface of the liquid, and liquid will be drawn into the foam evacuating means when the suction inlet is positioned below the surface of the liquid;

(e) a separating tank having an inlet and separate outlets for air and liquid, the tank so constructed and arranged that collapsed foam and air entering the tank will be separated before discharge therefrom;

(f) connecting means to connect the outlet of the foam evacuating means to the inlet of the separating tank;

(g) a line means connected to the connecting means;

(h) a valve disposed in the line means;

(i) a valve disposed in the connecting means intermediate the line means connection and the separating tank, coacting with the valve in the line means so that upon proper setting of the valve in the connecting means and the valve in the line means the discharge from the foam evacuating means can be selectively apportioned between the line means and the separating tank;

(j) a bridge means movably disposed over the top of one of the treatment tanks;

(k) the foam evacuating means movably mounted on the bridge means; and (l) control means operatively associated with the foam evacuating means and the bridge means to selectively move the foam evacuating means and the bridge means to pass the suction inlet of the foam evacuating means over the entire surface of the treatment tank to collect the foam therefrom.

13. The combination claimed in claim 9 wherein the foam evacuating means includes a centrifugal blower connected to a means of motive power.

14. A foam collection and disposal system for use with a treatment facility having a plurality of treatment tanks, comprising:

(a) a foam evacuating means having a suction inlet and an outlet therein;

(b) a series of defoaming columns connected intermediate the treatment tanks and in series relationship therewith;

(c) a common air supply means connected to each of the defoaming columns, the air to be defused through the defoaming columns to induce maximum foaming therein;

(d) the suction inlet of the foam evacuating means constructed and arranged to draw foam and air from each of the defoaming columns into the foam evacuating means wherein the foam will be collapsed and discharged from the outlet thereof; and (e) a separating tank connected to the outlet of the foam evacuating means, having separate discharge outlets for air and liquid to separate the air and collapsed foam before discharge therefrom.

15. A foam collection and disposal system for use with a treatment facility having a plurality of treatment tanks comprising:

(a) a foam evacuating means having a suction inlet and an outlet therein;

(b) a series of defoaming columns connected intermediate the treatment tanks and in series relationship therewith;

(c) each of the defoaming columns having an inlet and an outlet so constructed and arranged that the inlet is disposed on one side thereof and above the outlet on the other side thereof;

(d) air supply means connected to each of the defoamings columns at the bottom thereof, to supply air to each of the defoaming columns;

(e) a perforated member disposed transversely across each of the defoaming columns adjacent to the air supply means and intermediate the connection of the air supply means and the outlet whereby the air will be induced into diffusing action in the defoaming column to generate foam at the upper end thereof;

(f) an air bleed means adjacent to the top of each of the defoaming columns to introduce transporting air therein;

(g) a foam evacuating means having a suction inlet and an outlet therein;

(h) the suction inlet of the foam evacuating means constructed and arranged to draw the foam and the air from each of the defoaming columns into the foam evacuating means wherein the foam will be collapsed and discharged from the outlet; and (i) a separating tank connected to the outlet of the foam evacuating means having separate discharge outlets for air and liquid to separate the air and collapsed foam before discharge therefrom.

16. The combination claimed in claim 14 wherein the foam evacuating means includes a centrifugal blower connected to a means of motive power.

(References on following page)

References Cited by the Examiner

UNITED STATES PATENTS

| | | | |
|---|---|---|---|
| 13,743 | 11/1855 | Bakewell | 55—473 |
| 1,801,964 | 4/1931 | Kuendig | 230—137 |
| 1,900,642 | 3/1933 | Gerlach | 230—1 |
| 1,944,267 | 1/1934 | Rathbun | 55—473 X |
| 1,986,573 | 1/1935 | Kuendig | 230—137 |
| 2,059,017 | 10/1936 | Nickle | 55—473 |
| 2,086,730 | 7/1937 | Mick | 210—523 |
| 2,141,782 | 12/1938 | Benoit | 55—473 X |
| 2,227,302 | 12/1940 | Edstrom | 55—473 X |
| 2,380,465 | 7/1945 | Proudman | 210—220 X |
| 3,060,483 | 10/1962 | Black | 230—127 X |
| 3,133,017 | 5/1964 | Lambeth | 210—220 X |
| 3,169,841 | 2/1965 | Weiss | 55—178 X |

REUBEN FRIEDMAN, *Primary Examiner.*

R. W. BURKS, *Assistant Examiner.*